Nov. 18, 1969 F. E. ROBISON ET AL 3,478,386
HIDE PULLER APPARATUS
Filed Oct. 2, 1967 5 Sheets-Sheet 1
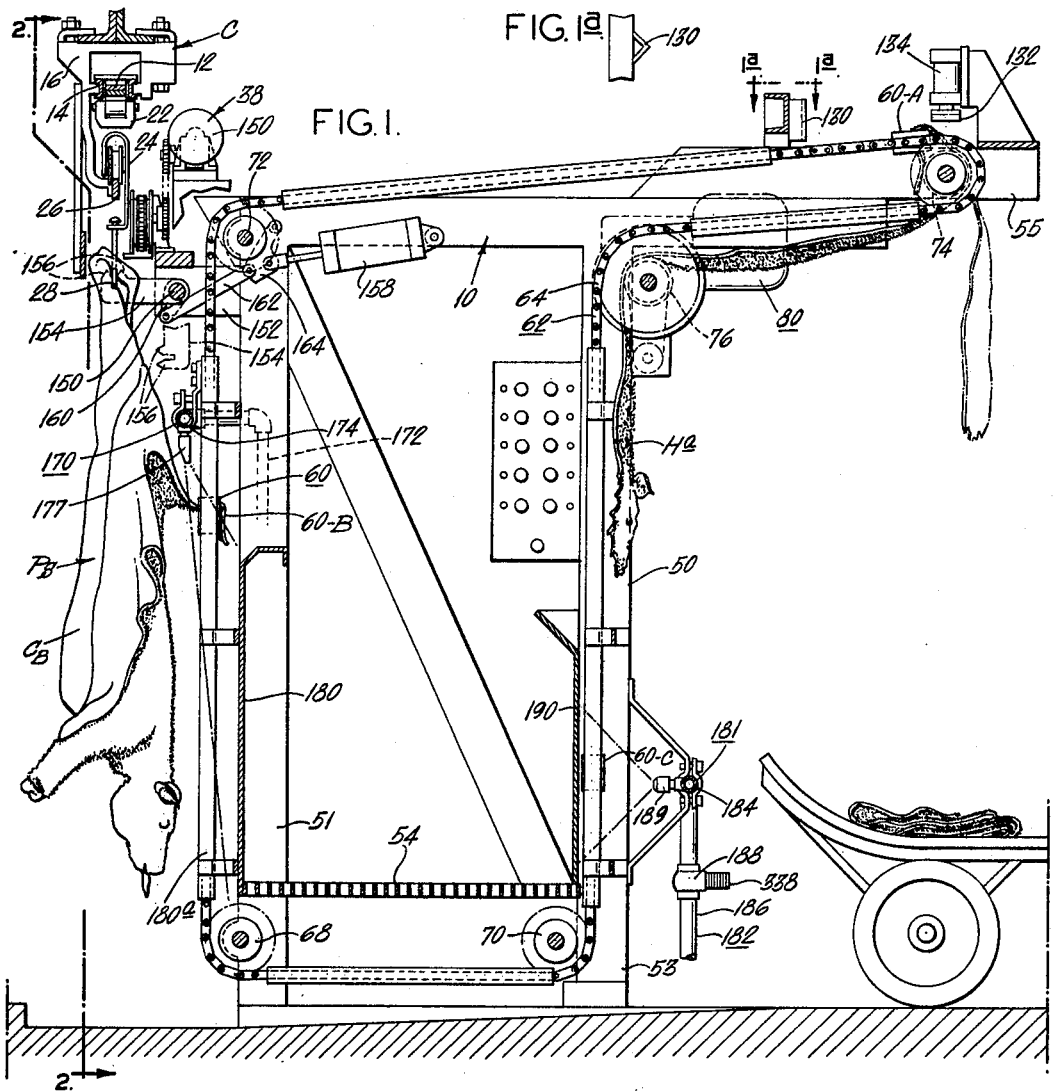
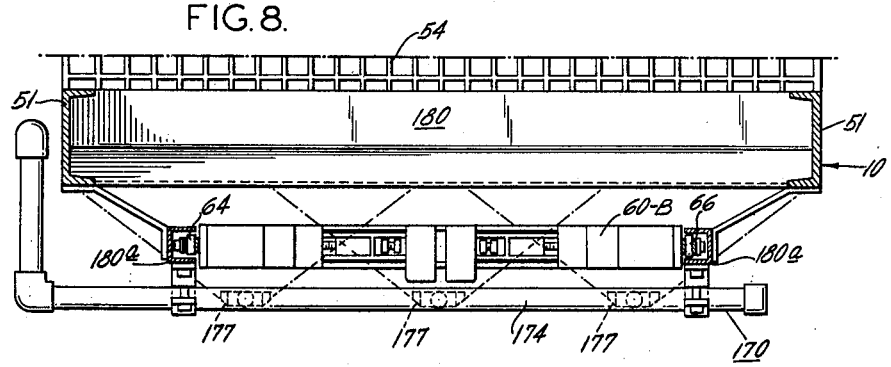
INVENTORS:
FRED E. ROBISON
KENNETH C. COCHRAN
BY Howson & Howson
ATTYS.

INVENTORS:
FRED E. ROBISON
KENNETH C. COCHRAN
BY Howson & Howson

Nov. 18, 1969   F. E. ROBISON ET AL   3,478,386
HIDE PULLER APPARATUS
Filed Oct. 2, 1967   5 Sheets-Sheet 3
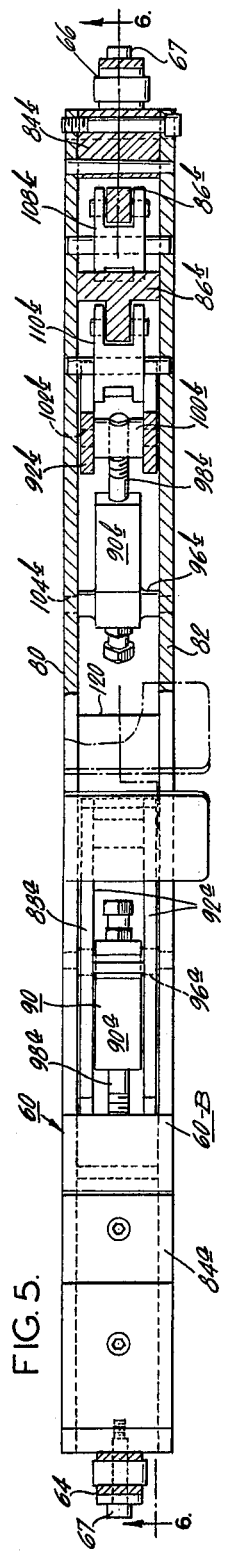
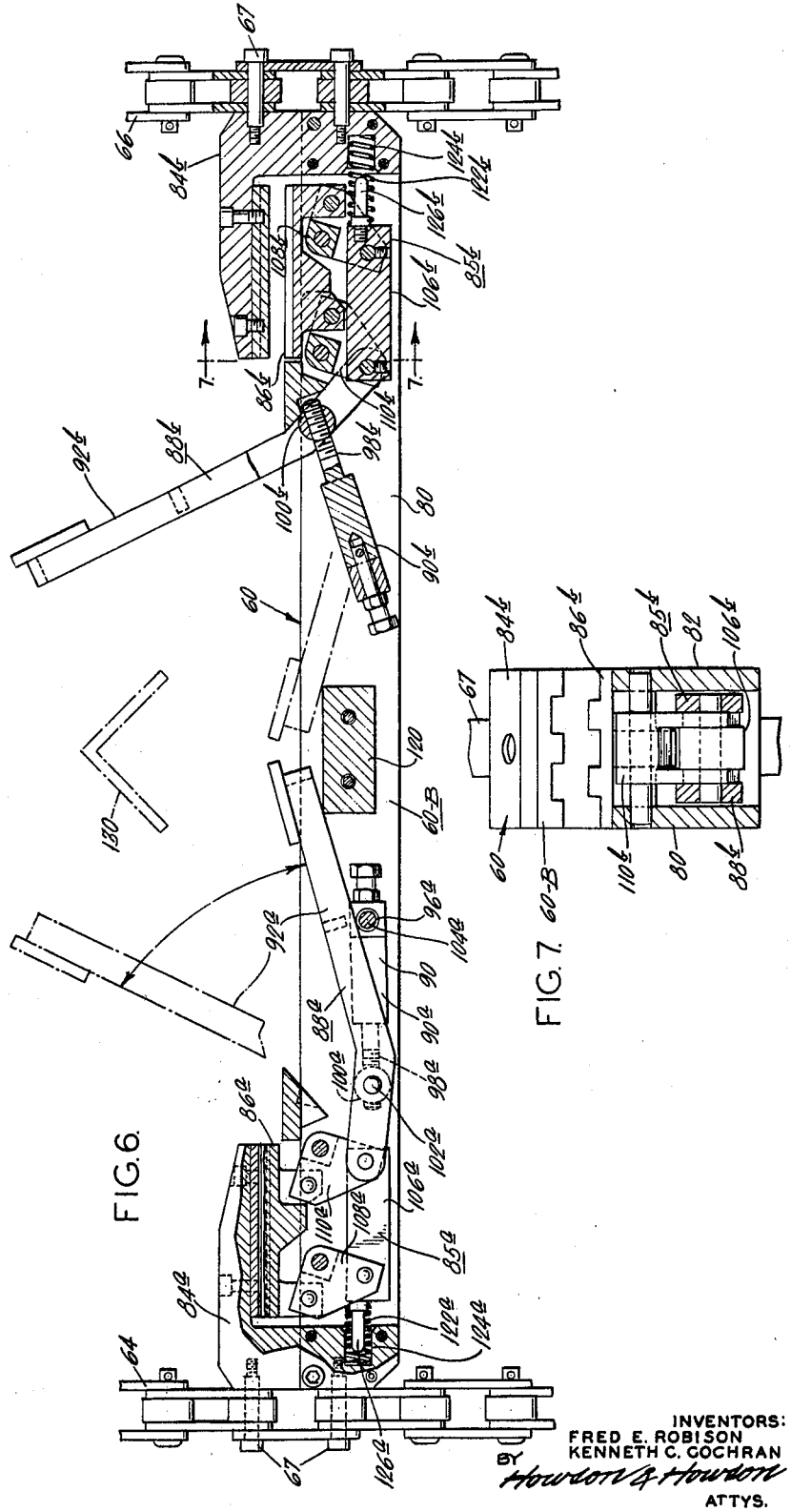
INVENTORS:
FRED E. ROBISON
KENNETH C. COCHRAN
BY Howson & Howson
ATTYS.

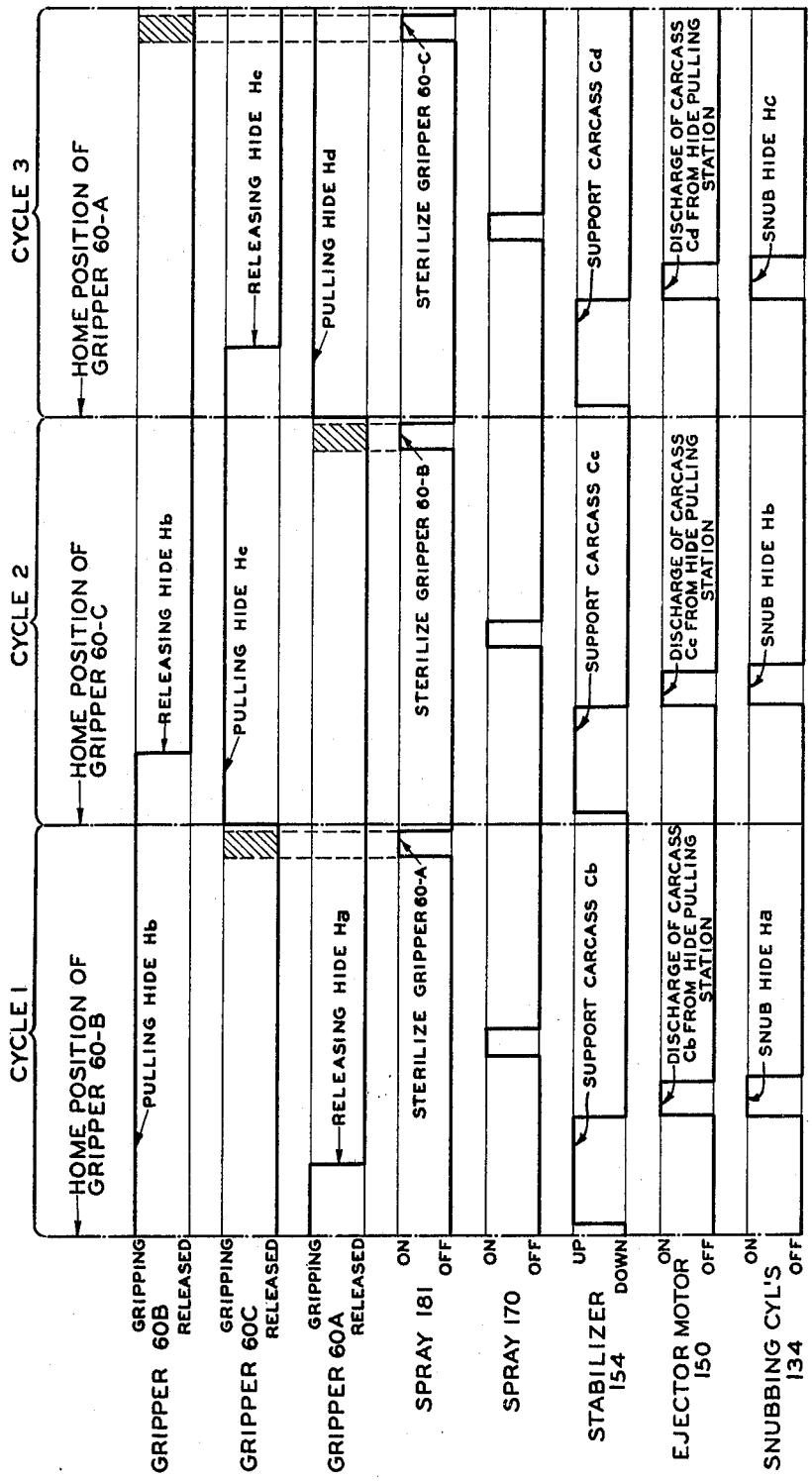

United States Patent Office 3,478,386
Patented Nov. 18, 1969

3,478,386
HIDE PULLER APPARATUS
Fred E. Robison and Kenneth C. Cochran, Franklin County, Pa., assignors to Acme Markets, Inc., Philadelphia, Pa., a corporation of Delaware
Filed Oct. 2, 1967, Ser. No. 672,046
Int. Cl. A22b 5/16
U.S. Cl. 17—21        9 Claims

ABSTRACT OF THE DISCLOSURE

A hide puller apparatus for use in processing slaughtered livestock and adapted to be disposed along the path of a conveyor which moves the carcasses through various stations. The hide puller comprises a main frame structure which mounts a plurality of hide gripping mechanisms adapted for movement in an endless path. In each complete hide stripping cycle, a given gripping mechanism moves from a "home" position where the operator secures the hide to the gripping mechanism to a "dwell" position and at the outset of the next cycle to a "discharge" position where the stripped hide is discharged into a collecting bin or the like. Suitable control mechanisms and circuitry are provided for effecting continuous movement of carcasses on the main conveyor to the hide puller for the stripping operation. The hide puller further includes a sterilizing system for automatically sterilizing portions of the apparatus which come in contact with the carcass during a stripping cycle.

---

The present invention relates to a new and improved method for stripping hides from the carcass of slaughtered livestock.

The common practice presently used in preparing some animal carcasses after they are slaughtered is to remove the head, feet and viscera and then place them in a refrigerator for a predetermined length of time. After a cooling period, the hide is stripped manually. This practice is commonly referred to as "cold skinning." This method has several disadvantages and drawbacks. For example, it has been found that it is extremely difficult to remove the hide from the cooled carcass by reason of the fact that the hide clings tenaciously to a chilled carcass and thus careful scraping and extensive knife work is required to remove the hide cleanly. Further, it has been found that even when great care is taken, in some instances, the pulling of the hide detaches meaty portions of the carcass which, of course, is undesirable. Furthermore, this is a time consuming process by reason of the fact that the carcasses are first placed into a refrigerator and then removed and, of course, the manual operation to remove the hides even by skilled workers takes a considerable amount of time. Moreover in some instances the carcasses may be contaminated from dirt, hair, and other foreign matter carried by the hide. Additionally, by hand trimming or cutting of the hide, often the hide is damaged by knife cuts and the value thereof for tanning purposes is reduced considerably.

In some instances, after removal of the head and feet, the hide is removed before refrigerating the carcass by automatic hide pullers. This method is commonly referred to as "hot skinning." However, in these devices with the carcass suspended from its hind legs, the hide is pulled upwardly from the head portion. Thus, since the hide is dirty, dust particles, as well as hair, fall on to the skinned portion of the carcass thereby requiring additional difficult cleaning of the animal after stripping. Further, there is no guarantee in these procedures that a diseased animal which would be noted at the inspection station had not contaminated subsequent carcasses being processed in the line.

With the foregoing in mind, an object of the present invention is to provide a novel hide pulling method and apparatus which overcomes the disadvantages and drawbacks of the presently existing procedures and apparatus used for this purpose.

In procesing livestock in accordance with the present invention, after slaughtering, the carcass is prepared for the hide removing operation. This preliminary preparation of the carcass consists of removal of the feet and cutting the hide pattern which includes skinning of the hide from the hind legs to form what is referred to hereinafter as hind shank portions of the hide. The carcasses are directly suspended from the hind quarters on a movable conveyor which then moves them to a hide pulling station for complete removal of the hide. Broadly the hide puller comprises an upright main frame structure including conveyor means mounting a series of spaced gripper mechanisms for movement in an endless path. During a complete stripping cycle of the hide puller, a given gripper assembly moves from a "home" position where an operator attaches the hind shank portions of the hide to the gripper whereby the hide is pulled downwardly away from the carcass to a "dwell" position and at the start of the next cycle of operation to a "discharge" position wherein the hides are deposited in a suitable collecting means.

Some of the features of the apparatus include sterilizing means whereby all of the parts of the apparatus which may be contacted by the carcass during a given stripping cycle are completely sterilized thereby eliminating the possibility of a diseased carcass in the line contaminating subsequent carcass entering the hide pulling station. More specifically in the illustrated embodiment of the invention there are three equispaced gripper mechanisms which are cycled in a predetermined manner so that in each stripping cycle one of the three gripping mechanisms is empty and moves through a sterilizing station and at the beginning of each cycle is located at the "home position" thereby insuring a clean gripping mechanism for each carcass passing through the hide puller station. Further, the framework includes a front shield assembly which confronts the carcass when it is in position at the hide puller which in a predetermined portion of the stripping cycle after the stripped carcass leaves the hide pulling station, is also completely sterilized. By this arrangement, the parts of the apparatus which the carcass may contact during a stripping cycle are completely sterilized automatically before another unstripped carcass enters the hide puller.

The present invention eliminates the disadvantages and drawbacks of prior systems used. For example, by stripping the hide downwardly from the animal, the stripped carcass is free of dust, dirt and other foreign particles which may be carried by the hide and which heretofore in some instances were picked up by the carcass. Further, the hide comes away much more cleanly by reason of the fact that the carcass is not chilled, thereby precluding stripping of meat portions of the carcass during removal of the hide. In accordance with the present invention, knife work is substantially eliminated and thus, all of the hides removed are suitable for tanning. Additionally, by reason of the direct continuous operation from slaughtering to final carcass washing, the entire preparation time is reduced considerably and labor costs are cut. The system insures that even if a diseased carcass passes through the hide puller, subsequent carcasses will not be contaminated by reason of the fact that the essential portions of the apparatus which may be contacted by the carcass are completely sterilized after each stripping cycle.

Other features of the hide puller apparatus and more specific details thereof are hereinafter more fully set forth and described, reference being made to the accompanying drawings, wherein:

FIG. 1 is a side elevational view partly in section of a hide pulling apparatus in accordance with the present invention;

FIG. 1a is a fragmentary view of the gripper release member taken on lines 1a—1a of FIG. 1;

FIG. 5 is an enlarged plan view partly in section of a hide gripper mechanism taken on lines 5—5 of FIG. 2;

FIG. 6 is a sectional view taken on line 6—6 of FIG. 5, one side showing the gripping mechanism in a clamping position and the other side showing the gripper mechanism in an open or release position;

FIG. 7 is an enlarged sectional view taken on line 7—7 of FIG. 6;

FIG. 8 is a sectional view showing a portion of the sterilizing system taken on line 8—8 of FIG. 2;

FIG. 10 is a diagrammatic showing of the cyclic operation of the apparatus.

Figure 2:
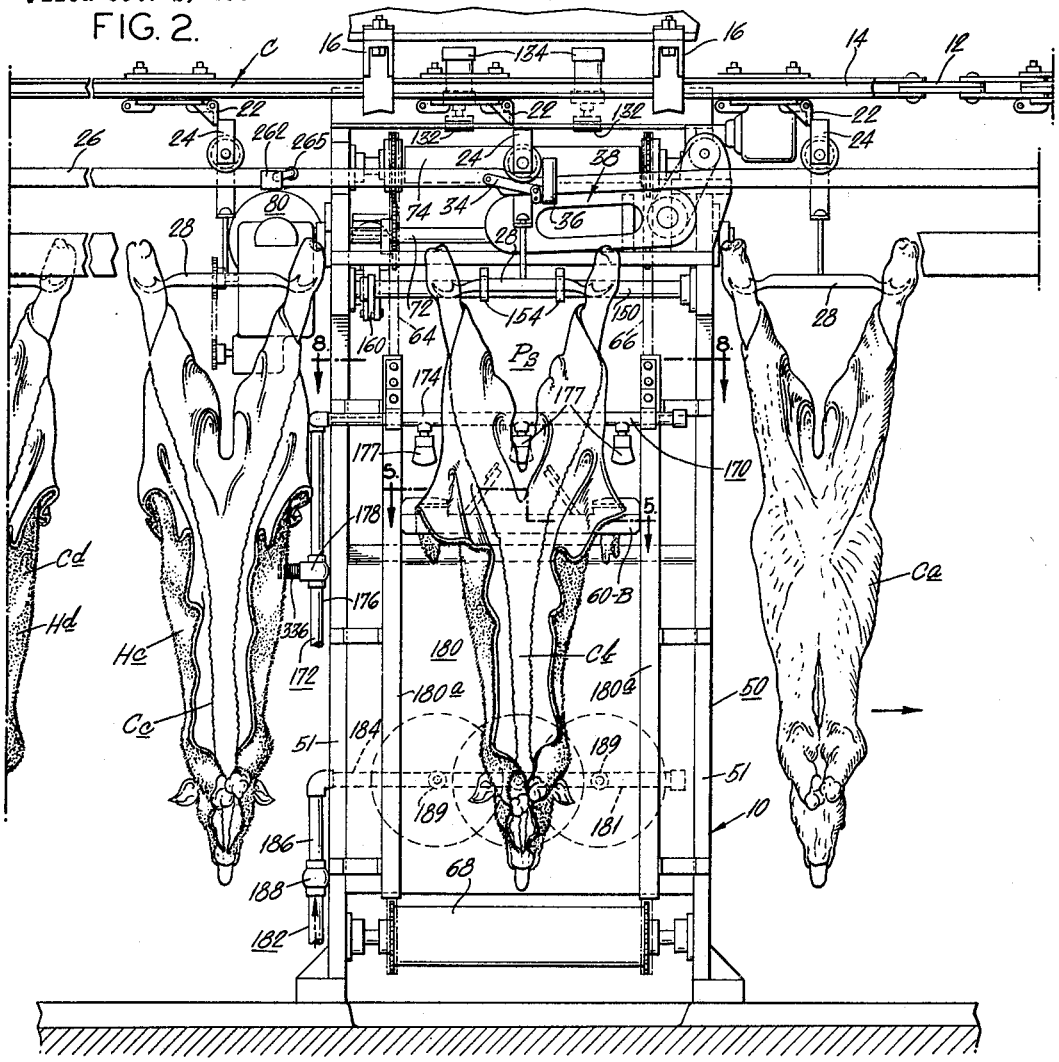
FIG. 2 is a front elevational view of the apparatus taken on lines 2—2 of FIG. 1.

Referring now to the drawings, and particularly to FIGS. 1 and 2 thereof, there is illustrated a hide puller in accordance with the present invention which is generally designated by the numeral 10 and is adapted to be positioned on the 'kill' floor at a selected location in the path of the main conveyor C. As noted above, after the animals are slaughtered and preliminarily trimmed by removing the feet and partially skinning the hide so that they are in the condition shown in FIG. 2 on the left hand side, each carcass is placed on the main conveyor upstream of the hide puller and then are continuously moved to the hide pulling station $P_s$. After the hide is stripped, the carcass is discharged from the hide pulling station and the main conveyor C moves the stripped carcasses to other locations, for example, for inspection and eventually they are removed from the conveyor and placed in a refrigerated room for chilling.

The conveyor C is of the type commonly referred to as a drop finger conveyor and comprises an endless chain 12 adapted for movement in a trackway 14 which is suitably supported at spaced locations, in the present instance, from the ceiling by support brackets 16. The chain 12 mounts a plurality of pushers 22 at selected equi-spaced locations on the chain which are adapted to engage trolley wheel hangers 24 and move them along a fixed rail 26 mounted below the chain. The hangers mount lanyards 28 at their lower terminal ends upon which each carcass is supported. The chain 12 is driven in an endless path by means of a main conveyor motor 30 (see FIG. 9). The main conveyor rail 26 has an offset portion defining a so-called pocket 32 at the hide pulling station whereby as hangers 24 are moved toward the hide pulling station by the pushers 22, the hanger wheel drops into the pocket 32 thereby disengaging the pusher and permitting the carcass to dwell at the hide pulling station for stripping of the hide. As the hanger drops into the pocket, its wheel engages a lever 34 which closes switch 36 to condition the main control circuit for operation in a manner described in more detail hereinafter. After the hide has been stripped, an ejector mechanism broadly designated by the numeral 38 engages the hanger for the stripped carcass and moves it out of the hide pulling station to a position on the rail where it is engaged by a pusher of the main conveyor to move the stripped carcass to another station.

Considering now the specific structural details, arrangement and operation of the hide puller, the apparatus comprises a main frame structure generally designated by the numeral 50 of generally rectangular form including upright pairs of front and rear post members 51 and 53, a platform 54 above the level of the kill floor and a rearward boom extension 55. Mounted on the frame and adapted for movement in an endless path to strip the hides from the carcasses are a plurality of gripper mechanisms generally designated by the numeral 60. In the present instance there are three gripper mechanisms 60–A, 60–B and 60–C which are mounted for movement in an endless path by means of a conveyor system designated by the numeral 62. The conveyor system includes a pair of chains 64 and 66 mounted for movement in an endless path on opposite sides of the main frame structure on sprockets carried by a series of rotatably mounted rolls. These rolls include a pair of lower idler rolls 68 and 70 and an upper idler roll 72 mounted at the front upper corner of the frame, an idler roll 74 mounted adjacent the far end of the boom and a drive roll 76 mounted in the rear part of the frame at the inner terminal end of the boom. The gripper conveyor system is actuated by a hide puller motor 80 connected through a gear reduction box to the drive sprocket for the drive roll 76.

The details of the gripper or clamping mechanism is best shown in FIGS. 5 and 6. Each gripper mechanism comprises a pair of side plates 80 and 82 mounting therebetween at opposite ends the fixed jaw 84a and 84b of two identically constructed clamping jaw assemblies 85a and 85b. As illustrated, the gripper mechanism is secured to the chains 64 and 66 of the hide puller conveyor by means of screw fasteners 67.

Each clamping jaw assembly is of identical construction and accordingly only one assembly is described and the identical parts of each will be identified with the same numeral and subscripts $a$ and $b$. Thus, the gripping jaw assembly 85a further includes a lower movable jaw member 86a which is actuatable by means of a toggle linkage broadly designated by the numeral 88a between a closed or gripping position (left hand side of FIG. 6) and an open position (right hand side of FIG. 6) to permit insertion of the end of a hide. The toggle linkage includes a retainer link 90 pivotally supported at one end between the side plates 80 and 82 on a toggle pivot 96a and at its opposite end to an actuating lever 92a. As illustrated, the retainer link 90a has a threaded stud portion 98a received in an internally threaded web portion 100a of the lever to permit selected adjustment of the distance between the pivot centers 102a and 104a, so as to provide means for adjusting the bite for the gripper jaws in the closed or gripping position. This is a desirable feature for the reason that the hide thickness is not always uniform. For example, hide thickness may vary depending on the size of the animals. Additionally, hide characteristics may be affected by climate and other weather factors. The inner end of the lever 92a is pivotally connected to a link bar 106a which at opposite ends is pivotally supported on two generally triangularly shaped bell cranks 108a and 110a which in turn are pivotally supported between the side plates. The lower movable jaw member 86a is also pivotally connected to a corner of each of the bell cranks. The link bar 106a is normally biased toward the spacer 120 at the center of the gripper assembly and normally urges the lever 92a to a raised position wherein the jaws are in an open position by means of a coil spring 122a seated in a packet 124a in the fixed jaw 84a and circumscribes a finger-like projection 126a on the link bar 106a. The pivotal center 104a of the retainer link 90a, its pivotal connection 102a to the lever 92a and the bell cranks are oriented relative to one another in such a fashion that when the lever 92a is moved downwardly to close the jaws to a fully closed position, an over center arrangement is provided to lock the jaws in place. The jaws 84a and 86a have a meshing tooth configuration as best illustrated in FIG. 7 to insure tight gripping of the hide when the jaws are locked.

Thus, in the normal operation of the hide puller, when a clamp assembly is at the "home position" the levers 92a 92b are raised and the jaws are in an open position permitting the operator to insert the hind quarter portions of the hide in each of the jaws. The operator then simply rotates each lever toward the center spacer 120 with respect to FIG. 6 thereby to clamp the jaws in a closed position and secure the hide. Thereafter, as explained in more detail, the operator simply operates the chain conveyor for the gripper mechanisms and as the gripper 60–B for example, is moved from a "home position" downwardly during a cycle of operation, the hide is stripped. The stripped hide is then moved to the "dwell position" (of gripper 60–A in FIG. 1) at the end of one cycle of operation. At the start of the next cycle of operation, the gripper assembly at the "dwell position" moves toward the "home position" and during the course of movement in this direction, the levers 92a and 92b engage a release mechanism in the form of a V-shaped bumper 130 disposed centrally of the boom which causes the gripping jaw assembly to open to permit release of the stripped hide. Shortly after engagement of the levers by the bumper 130, a pair of snubbing shoes 132 are actuated downwardly by piston cylinder actuators 134 to snub the hide against the idler roll 74 and insure release of the hide from the gripper assembly. When the shoes 132 are retracted, the stripped hide falls downwardly to the accumulation cart or bin or to a conveyor transporting the hide to another location.

Figure 3:
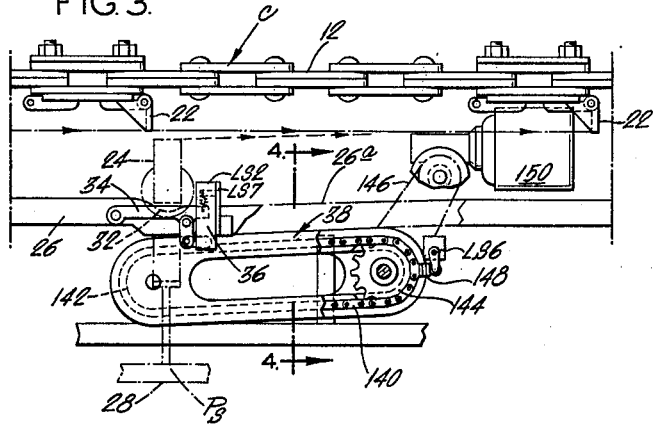
FIG. 3 is a fragmentary side elevational view of the pocket and ejector mechanism in the main conveyor permitting continuous operation of the main conveyor while a carcass is being stripped at the hide pulling station.
Figure 4:
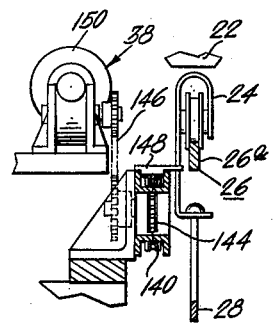
FIG. 4 is a sectional view taken on lines 4—4 of FIG. 3.

When a carcass at the hide pulling station has been stripped of its hide, the ejector mechanism 38 moves the carcass from the hide pulling station to a position downstream where it is engaged by the main conveyor to advance it to the next station. The ejector mechanism, which is best shown in FIG. 3, comprises an endless chain 140 mounted between an idler sprocket 142 and a drive sprocket 144 connected by chain 146 to the ejector motor 150. The chain 140 mounts an ejector lug 148 adapted to engage a hanger and move it from the pocket 32 up the inclined portion 26a of rail 26 to a position where it can be engaged by a pusher 22. Cycling of the ejector mechanism to advance a carcass from the hide pulling station in the manner described above is controlled by the main control circuit as set forth in greater detail hereinafter.

Another feature of the hide pulling apparatus of the present invention is the provision of means for stabilizing the carcass at the hide pulling station which supports the weight of the carcass during the hide pulling cycle. The stabilizer, as best illustrated in FIGS. 1 and 2, comprises a bar 150 pivotally supported between support brackets 152 projecting forwardly from the main frame slightly below the level of the main conveyor rail 26, which bar 150 supports a pair of spaced apart stabilizing arms 154 having bifurcated terminal end portions 156 which are adapted in one position to straddle the lanyard 28 to support the weight of the carcass during the hide pulling cycle. The stabilizing arms 154 normally are in a position extending generally parallel to the vertical run of the hide puller conveyor and are actuatable to the support position during a selected portion of the hide pulling cycle by means of a piston-cylinder actuator 158 through a linkage connection. The linkage comprises a link 160 connected to bar 150 which at its terminal end is pivotally connected to a transfer link 162 which in turn is connected to a triangularly shaped bell crank 164 in turn connected to the piston of the stabilizing actuator 158. By this arrangement when the piston of actuator 158 is retracted, the stabilizing arms 154 are in the downward position and upon displacement of the piston outwardly through the bell crank and transfer link, the rod 150 is rotated to position the bifurcated fingers 156 in engagement with and straddling the lanyard in the position shown in FIG. 2. The stabilizing mechanism is under the control of the main control circuit to be actuated between extended and retracted positions at a predetermined point in the stripping cycle as explained hereinbelow in more detail in connection with the description of the main control circuit.

In accordance with the present invention, means is provided for sterilizing parts of the apparatus which may contact a carcass during the hide pulling cycle so that for successive hide pulling operations, the apparatus is completely sterilized thereby eliminating the risk, for example, of a contaminated or diseased carcass contaminating subsequent carcasses entering the hide pulling zone. To this end, a first spray nozzle assembly generally designated by the numeral 170 is provided at the front of the apparatus and comprises a conduit 172 connected to a suitable source of sterilizing medium, for example, sterilizing water at a temperature of above 180°, the conduit 172 having a lateral horizontally extending portion 174 mounting a plurality of spaced spray nozzles 177 along its length and having a vertical leg 176 having a solenoid control valve 178 for selectively controlling discharge of the sterilizing medium through the nozzles 177 at a selected time in the stripping cycle in the manner described in detail in connection with the main control circuit. The main frame mounts an upstanding shield 180 confronting the lower half of a carcass at the hide pulling station and the nozzles 177 are oriented to direct the sterilizing medium against the shield, and channel-shaped guide member 180a overlies the vertical run of the hide puller chain.

The sterilizing system further includes a second spray assembly 181 located on the back part of the apparatus consisting of a conduit 182 connected to a source of sterilizing medium having a horizontal leg portion 184, a vertical leg 186 which has a solenoid control valve 188 for selectively controlling flow of sterilizing medium to a plurality of nozzles 189 in the horizontal conduit portion 184. The nozzles 189 as illustrated are adapted to direct the spray against a splash guard 190 located inboard of the hide puller conveyor run. The spray systems, of course, may be connected to the same source of supply.

In operation, therefore, the spray nozzles 177 are adapted to discharge a sterilizing medium in the area indicated by broken lines after a hide has been stripped from a carcass at the hide pulling station and has been discharged therefrom and prior to the entry of the next carcass on the rail of the main conveyor system and the spray nozzles 189 are adapted to spray an empty gripper assembly at the rear spray station which next advances to the "home position."

Considering briefly the operation of the sterilizing spray assemblies in connection with the operation of the hide puller, assume the parts of the apparatus are in position shown in FIG. 1, to start a cycle for stripping the hide of a carcass at the hide pulling station. Referring to FIG. 1 and specifically the hide puller conveyor chain, one of the gripping mechanisms 60–B is at the "home position" looking counterclockwise from the gripping assembly 60–B, the next gripping assembly 60–C is at the clamp spray station and the third gripping assembly 60–A is at the "dwell position." Now, as the apparatus is cycled to initiate operation of the hide puller conveyor, gripper assembly 60–B travels down the vertical run to strip the hide from the carcass and conveys the stripped hide past the clamp spray station to the hide "dwell position" just short of the hide discharge station. During this portion of the cycle, the stripped carcass is discharged from the hide puller and the front spray nozzles 177 are automatically actuated to sterilize the front portion of the apparatus prior to entry of the next carcass (see FIG. 10). During movement of the hide puller conveyor, gripper assembly 60–A passes through the discharge whereupon the snubbing shoes 132 are cycled to effect discharge of a hide and advances past the "home position" to the rear spray station. The empty gripper assembly 60–C which has been sterilized at the terminal end of the preceding cycle (see FIG. 10), during the course of movement of the conveyor now arrives at the "home position" in position for the next hide.

Figure 9:
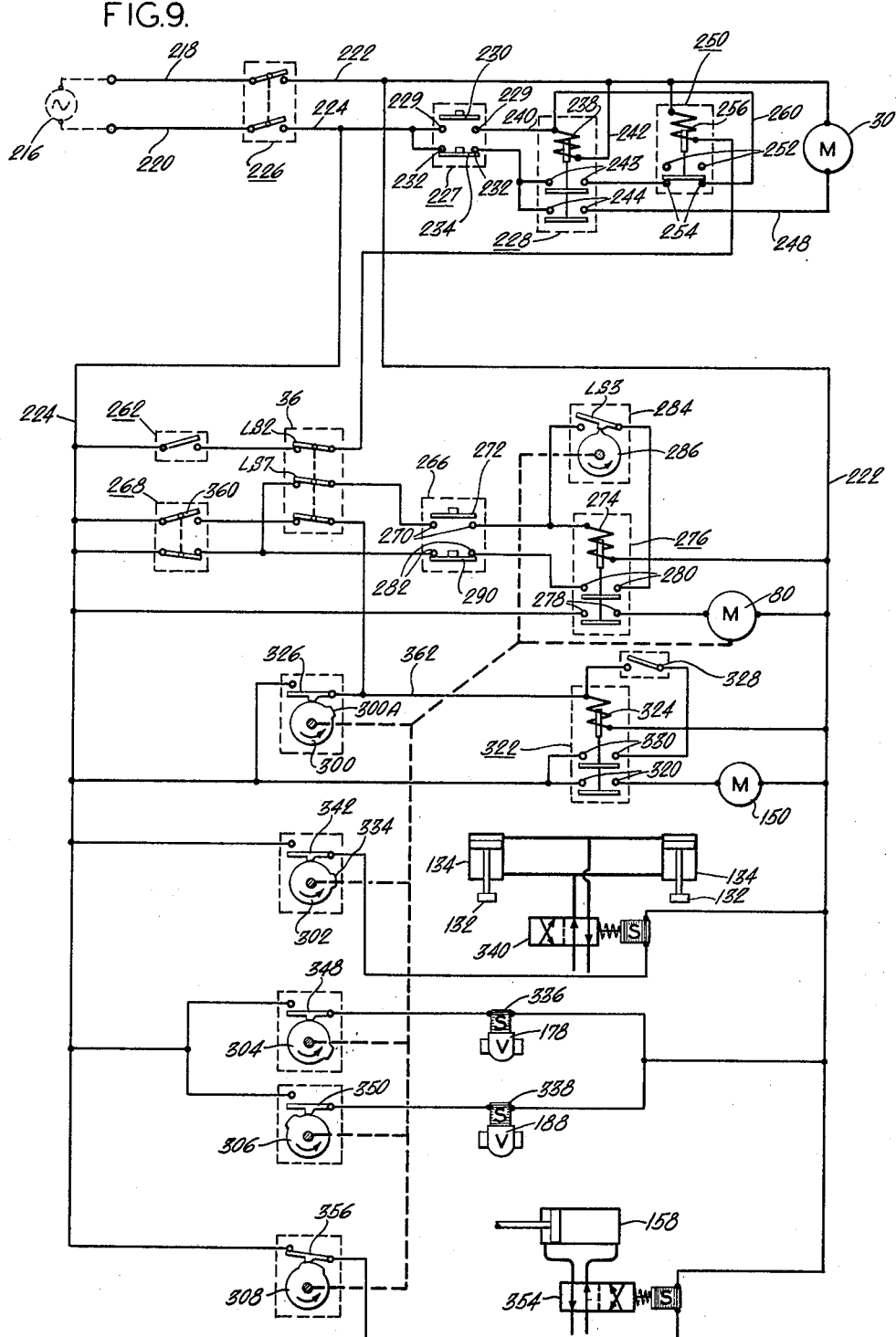
FIG. 9 is a schematic of the electrical system for controlling operation of the hide puller apparatus and main conveyor.

FIG. 9 illustrates, by way of example only, one possible form of electrical control system for operating the hide puller illustrated in the other drawings. While various other automatic and manual controls may also be incorporated in the system for particular applications, the circuit now to be described provides the necessary basic operations required for operation.

Referring now to FIG. 9 in detail, the main conveyor motor 30, the hide puller motor 80 and the ejector motor 150 are shown for convenience as single-phase motors, although it will be understood that where multiphase motors are utilized, the switch control apparatus supplying each motor will be duplicated for each additional supply-phase line. A source 216 of alternating voltage supplies power to power lines 218 and 220 and thence to power lines 222 and 224 by way of manually operable circuit breaker 226, which serves not only as the primary manual control switch for the entire system, but also provides protection against current overload by opening automatically in response to such overloads.

One power line 222 is connected directly to motor 30, while the other power line 224 is connected to motor 30 by way of start-stop switch 227 and self-latching relay 228. More particularly, start-stop switch 227 comprises a pair of normally open START contacts 229, a momentary contact START button 230, a pair of normally closed STOP contacts 232 and a momentary contact STOP pushbutton 234. At the beginning of operations, no current passes through either set of contacts of the start-stop switch. However, when the START pushbutton 230 is momentarily depressed to provide connection between START contacts 229, the coils 238 of relay 228 is connected directly between power lines 222 and 224 by way of lines 240 and 242.

Relay 228 comprises a first pair 243 and a second pair 244 of normally open contacts, both of which pairs of contacts are closed only when relay coil 238 is energized. Thus, when START pushbutton 230 is operated to energize coil 238, relay contacts 244 are closed to connect power line 224 to motor 30 by way of line 248, thereby to initiate operation of the motor.

Also provided is a safety relay 250 which, under normal conditions of operation, provides a closed circuit path for latch relay 228 to maintain the coil 238 thereof in its energized condition. Safety relay 250 comprises a pair of normally open contacts 252 and a pair of normally closed contacts 254, and is responsive to current energization of its control coil 256 to open contacts 254 and close contacts 252. As will become more apparent hereinafter, in normal operation, contacts 254 are closed so that current from power line 224 passes through normally closed contacts 232 of the start-stop switch 227, through the closed contacts 243 of relays 228, through the normally closed contacts 254 of relays 250, and thence by way of line 260 through relay coil 238 to power line 222. In this way relay 228 is maintained energized, or "latched," once the START pushbutton 230 has been operated, so that power continues to be applied to the main conveyor motor 30 to maintain it in operation.

From the foregoing it will be apparent that once motor 30 is operating, it will be shut down if contacts 254 of safety relay 250 are opened by energization of control coil 256 of the relay. The latter control coil 256 is connected between the power lines 222 and 224 by way of normally open safety switch 262 and weight-responsive three-pole normally open switch 36. For relay coil 256 to be energized, it is then necessary for both switches 262 and 36 to be closed at the same time. Switch 36 is closed by the weight of a carcass when the carcass is in position in the hide puller apparatus, while safety switch 262 is closed by a hanger 24 carrying the next carcass when the next carcass has approached the hide puller station sufficiently closely to strike the switch arm 265. Accordingly, should a subsequent carcass approach the carcass already in the hide puller sufficiently closely that there is a danger of contact occurring between the two carcasses, both of switches 262 and 36 will be closed, current will flow through relay coil 256, contacts 254 will thereby be opened, the coil 238 of relay 228 will become de-energized, contacts 244 of relay 228 will therefore open, and main conveyor motor 30 will then stop to prevent nearer approach of the subsequent carcass to that in the hide puller apparatus.

Manual stopping of the main conveyor motor can be accomplished by momentarily opening STOP pushbutton 234, which cuts off current to latching relay coil 238, causing contacts 244 to reopen and disconnect power from motor 30. The contacts of relay 228 will thereafter remain in their normally open condition, and the motor will remain shut down, until the START button 230 is again operated.

After a hide has been fastened in a gripper by the operator, the hide puller motor 80 is placed into operation by manual actuation of start-stop switch 266, provided the carcass is in position in the hide puller apparatus and the bypass switch 268 is in its normal position, i.e. as shown in the figure. Thus, the positioning of the carcass in the hide puller causes closing of all three pairs of contacts of normally open switch 36 whereby power line 224 is connected through the bypass switch 268 and the switch 36 to normally open start contacts 270 of start-stop switch 266. When the momentary contact pushbutton 272 of start-stop switch 266 is operated, control coil 274 of hide puller motor relay 276 is connected between the power lines 222 and 224 and thereby energized. As a result, the pair of normally open contacts 278 of relay 276 are closed to connect hide puller motor 80 between the power lines 222 and 224 and to cause it to operate. Such actuation of relay 276 also closes contacts 280 thereof, thereby also connecting relay control coil 274 between lines 222 and 224 by way of bypass switch 268, normally closed contacts 282 of start-stop switch 266, normally open (but now closed) contacts 280 of relay 276, and cam operated switch 284. The cam wheel 286 which operates cam switch 284 is geared to and driven by hide puller motor 80 so that, although switch 284 is initially open, it is closed to complete latching of relay 276 in response to slight motion of cam wheel 286 due to initial motion of hide puller motor 80 when the START button 272 is momentarily actuated. Accordingly, cam switch 284 provides latching of the hide puller motor relay 276 until the hide puller has moved through one complete cycle of operation and is in the position to begin the next successive hide pulling operation, at which time cam wheel 286 again opens cam switch 284 to unlatch relay 276 and stop hide puller motor 80. The hide puller motor can also be stopped by a manual operation of normally closed pushbutton 290 of start-stop switch 266, which also interrupts the latching current for coil 274, deactuates relay 276 and stops the motor.

Also geared to hide puller motor 80 are five other cam wheels 300, 302, 304, 306 and 308 which control operation, respectively, of ejector motor 150, snubbing cylinders 134, front spray valve 178, clamp spray valve 188 and stabilizer actuating cylinder 158. Each of these cam wheels is geared to, and driven by, the hide puller motor 80, and has a speed, cam surface position and cam surface length suitable for producing the desired timed operation of these elements as shown in the timing diagram of FIG. 10.

More particularly, the ejector motor 150 is connected between power lines 222 and 224 by way of one normally open pair of contacts 320 of ejector motor relay 322. The control coil 324 of relay 322 is connected between power lines 222 and 224 by way of cam switch arm 326, which is normally open, but which is closed momentarily once each cycle by cam surface 300A of cam wheel 300. When cam surface 300A closes cam switch arm 326, relay coil 324 is energized, switch contacts 320 are closed, and the ejector motor 150 starts operation. Immediately upon such operation, the normally closed limit switch 328, which previously was held open by lug 148 on hide puller chain 140, recloses due to motion of the lug away from the limit switch arm and, since contacts 330 of relay 322 are also closed at this time, a latching current is supplied through the limit switch 328 and relay coil 324 so as to latch the relay and cause continued operation of the ejector motor through a complete cycle, until limit switch 328 is again opened by lug 148 at the end of the cycle.

Cam surface 300A of cam wheel 300 is positioned angularly behind that of cam wheel 286 by an amount such that ejector motor 150 does not begin operation until a time sufficient to pull the hide from the carcass has passed. Accordingly, the timing of the ejector motor operation is such as to pick up and move the stripped carcass from the hide stripper apparatus immediately after the stripping operation is completed, and to return it to a higher position in which it is moved by the main conveyor system. As discussed in connection with the timing diagram of FIG. 10, the ejector motor cycle is produced three times for each two complete revolutions of the hide stripper belt, as can readily be provided by an appropriate ratio between the gearing through which the hide puller motor 80 drives the hide puller chain and the gearing through which it drives cam wheel 300.

The snubbing cylinders 134 are to be operated at those times at which the dropping of the hide is to be provided, as illustrated in FIG. 10. The snubbing cylinders are actuated by a solenoid operated four-way valve 340, the solenoid of which is connected between the power lines 222 and 224 by way of the arm 342 associated with cam wheel 302. Arm 342 is normally open, but is operated by cam surface 334 to its closed position when the snubbing cylinders are to be operated.

The front spray valve 178 and the clamp spray valve 188 are controlled by solenoids 336 and 338, respectively, which are connected between the power lines 222 and 224 through switch arms 348 and 350 associated with cam wheels 304 and 306, respectively. Each time the cam surface of either of the cam wheels 304 and 306 closes its corresponding switch contact, the corresponding spray is actuated. The angular positions and lengths of the camming surfaces are again chosen to provide the desired timing and duration of sprays, as discussed previously in connection with FIG. 10.

Similarly, the stabilizer actuating cylinder 158 is actuated by a solenoid driven four-way valve 354, the solenoid of which is connected between the power lines 222 and 224 by way of the switch arm 356 associated with cam wheel 308. The cam surface of wheel 308 has an angular position and length such that switch arm 356 is in its closed position to operate the stabilizer from a time just before until just after each pulling operation, as also shown in FIG. 10.

As mentioned previously, limit switches may be employed instead of various of the cam operated switches described above. This can be accomplished by providing camming surfaces, moving with the hide puller chain, which operate limit switches fixed to the hide puller frame, in a manner which will be apparent to one skilled in the art. Limit switches may be preferred in certain applications where occasional adjustment of the timing relationships may be desirable and it is not desired to change gears or gear driven cams.

The arrangement of FIG. 9 also includes connections for permitting the hide pulling apparatus to be deactuated while permitting the carcasses to be carried along the main conveyor and through the hide pulling apparatus when desired. Thus, the normally open upper switch arm 360 of manual bypass switch 268 is connected through one of the three ganged poles of switch 36 to the line 362 leading to the end of relay control coil 324 to which cam operated switch arm 326 is also connected. Accordingly, when bypass switch 268 is thrown to its upper, or bypass position, power is disconnected from the hide puller motor 80 and all portions of the hide puller are deenergized except for the ejector motor circuit. The latter circuit is energized over line 362 each time a new carcass closes switch 36, to actuate relay 322 and start ejector motor 150. Initial motion of motor 150 permits switch 328 to close permitting the ejector mechanism to run through one complete cycle for each carcass, each cycle being terminated as described previously when switch 328 is opened by the lug 148 on chain 140 with no carcass in position to hold switch 36 closed. The arrangement therefore serves to move the carcasses through the hide puller apparatus, with no hide pulling operation being performed.

It will also be understood that a variety of other electrical control functions may be incorporated into the system where desired. Such possible additional features include pilot lights for indicating the state of operation of various portions of the circuitry, remote emergency-stop buttons provision, and control connections for operating the hide puller without running the conveyor. Other possible control features will readily occur to one skilled in the art.

Considering now briefly the operation of the hide puller described above, the main conveyor is actuated to feed carcasses along the rail to the hide stripper simply by depressing start push button 230 to operate the main conveyor motor 30. Now assume with respect to FIG. 2 carcass $C_a$ has just been discharged from the hide pulling station and carcass $C_B$ has just entered the hide pulling station. The stripped hide $H_a$ for the carcass discharged is in the "dwell" position as shown in FIG. 1. As the hanger 24 carrying carcass $C_B$ enters the pocket 32 on the main conveyor rail, switch 36 is closed to condition the hide pulling apparatus for a cycle of operation. The operator now positions the tail portions of the hide $H_b$ in the respective clamping jaws of the gripping mechanism 60–B at the "home position" and secures them in place by actuating the levers inwardly to close the jaws on the hide. The operator then places the hide puller motor 80 into operation by manual actuation of the start-stop switch 266 which in turn effects operation of the cam wheels 300, 302, 304, 306 and 308 which control operation respectively of the ejector motor, snubbing cylinders, front spray valve assembly, clamp spray valve assembly and stabilizer actuating cylinder. The first of these to come into operation automatically is the cam wheel 308 which closes switch 356 to actuate the stabilizing cylinder 158 to pivot the bifurcated support arms 154 upwardly to engage the lanyard and support the carcass $C_b$ during the stripping cycle. During the initial movement of the hide puller conveyor, the levers for gripper 60–A engages the bumper 130 to release hide $H_a$ from the jaws. At this point, cam 334 closes switch 342 to actuate snubbing cylinders 134 to lower snubbing shoes 132 to snub hide $H_a$ against idler roll 74 to insure disengagement therefor from gripper 60–A. Upon retraction of snubbing shoes 132, hide $H_a$ discharges to collecting cart $C_t$. When the hide $H_b$ is completely stripped from the carcass $C_b$ at the hide pulling station, the gripper 60–B has moved roughly to the position of gripper 60–C (FIG. 1) and through approximately one-half of a complete cycle. At this point, the cam wheel 308 opens switch 356 to move the stabilizer arms 154 to the retracted position to permit the stripped carcass $C_b$ to be moved out of the hide pulling station and wheel 300 has rotated to a position wherein its cam closes the switch 326 to initiate operation of the ejector motor 150. The ejector goes through one complete cycle until the switch 326 is again opened by the lug 148 on the chain 140 at the end of a cycle. When the stripped carcass $C_b$ has been discharged from the hide pulling station, the cam wheel 304 for the front spray valve assembly closes switch 348 to energize the solenoid for the control valve 178 whereby steam is discharged through the spray nozzles 177 to sterilize the front portion of the apparatus.

The gripper mechanism 60-B carrying the hide $H_b$ then continues past the rear spray station to the "dwell position" illustrated on the right hand side of FIG. 1. Adjacent the end of the stripping cycle, gripper 60-A moves through the clamp spray station and cam wheel 306 closes switch 350 to energize solenoid 188 to effect discharge of steam through nozzles 189 to sterilize gripper 60-A. This terminates one complete cycle of operation of the hide puller, the cam wheel 286 having been rotated to a position to open switch 284 which deactuates hide puller motor 80. As noted previously the hide puller motor can also be stopped by manual operation of normally closed push button 290 of stop-start switch 266 which also interrupts the latching current from coil 274, deactuates relay 276 and stops the motor. This provides a safety arrangement in the event the operator has to interrupt the hide pulling cycle for any reason. It is noted that while the hide is in the dwell position, the operator severs the head portion of the hide which is conveniently located relative to the operator.

The complete stripping cycle is timed so that the main conveyor may normally be operated continuously and the next adjacent carcass is in position to enter the hide puller station after a complete cycle of operation. In the event that the cycle has to be interrupted, the next adjacent carcass will not enter the hide pulling station by reason of the fact that its trolley wheel engages switch 262 to shut down the main conveyor. However, in the normal course the pusher for the next adjacent carcass $C_c$ moves it into the pocket 32 to engage switch 36 and condition the hide pulling apparatus for another cycle of operation. The operator then repeats the process of clamping the tail portions of the hide $H_c$ in the gripper mechanisms 60-C and operates the stop-start switch 266 which, as noted above, initiates operation of the hide puller motor 80 and the associated cam wheels 300–308 inclusive. It is noted that gripper 60-C has been sterilized in the preceding cycle of operation. Stabilizer arms 154 again are actuated to support carcass $C_c$ and during the first half of this cycle the gripper mechanism 60-C moves downwardly in the vertical run to strip the hide $H_c$ at the hide pulling station and the gripper mechanism 60-B is actuated to a position where the levers engage the release bumper 130. Simultaneously on engagement of the gripper mechanism 60-B with the release bumper 130, the cam wheel 302 for the snubbing cylinders closes switch 342 to actuate the snubbing shoes 132 downwardly and pinch or trap the hide $H_b$ against the idler roll. During continued movement of the hide puller conveyor, the snubbing shoes retract and permit the hide carried by gripper 60-B to discharge to cart $C_t$. Thereafter with the gripper assembly 60-C having moved halfway through the cycle wherein the hide $H_c$ is completely stripped from the carcass, the cam wheel 300 is rotated to a position closing the switch 326 to actuate the ejector motor 150 to move the stripped carcass $C_c$ up the inclined portion of the rail 26 to be engaged by a pusher and moved along the rail away from the hide puller, the cam wheel 308 having rotated to a position opening switch 356 to retract the stabilizing arms 154 to the lower position. At this juncture of the stripping cycle, the cam for the wheel 304 closes switch 348 to effect discharge of sterilizing medium such as steam through the nozzles 177 to clean and sterilize the front portion of the apparatus prior to entry of the next carcass $C_d$. During continued movement of the hide puller conveyor assembly, the gripper assembly 60-C with the stripped carcass $C_c$ is moved to the "dwell position" or that occupied by gripper C in FIG. 1 and empty gripper 60-B is moved into the clamp spray position whereupon the cam wheel 306 closes the switch 350 to energize the solenoid 188 for the valve 314 of the spray nozzles 189 to cleanse and sterilize the gripper 60-B. The gripper assembly 60-A in the meantime which was sterilized has moved to the "home position" for the next stripping cycle. By this arrangement it is clear that the various portions of the apparatus which are contacted by the hide puller during a stripping cycle are completely sterilized prior to initiation of the next stripping cycle.

We claim:

1. A hide puller for stripping hides from carcasses of slaughtered livestock comprising a main frame structure, a plurality of hide gripper mechanism means mounting said hide gripper mechanisms in said frame for movement in an endless path through a hide pulling cycle, a selected one of said hide gripper mechanisms in a complete hide pulling cycle moving from a home position wherein the hind hide portions are secured to said gripper mechanisms to a dwell position whereby during the course of movement of the selected gripper mechanism, the hide is stripped from a carcass and in the next successive cycle of operation the selected mechanism moves to a discharge position to discharge the stripped hide, and sterilizing means for sterilizing portions of the hide puller contacted by the hide or carcass of livestock during each stripping cycle.

2. A hide puller as claimed in claim 1 wherein said means for moving said hide gripper mechanisms comprises a gripper conveyor assembly disposed relative to the frame so that the gripper mechanisms move in a vertical plane from the home position during a stripping cycle adjacent the front of the hide puller and wherein said frame includes an upstanding shield confronting a portion of a carcass at the hide puller and a first spray nozzle assembly including a plurality of spray nozzles, means for supplying a sterilizing medium to said first spray nozzle assembly and control means for selectively effecting operation of the first spray nozzle assembly to discharge the sterilizing medium against said shield after a carcass is stripped and discharged.

3. A hide puller as claimed in claim 1 including a second spray nozzle assembly disposed at the rear portion of the main frame, means for supplying a sterilizing medium to said second spray nozzle assembly and means for selectively controlling discharge of sterlizing medium through said second nozzle assembly positioned to direct the sterilizing medium on hide gripper mechanisms at a predetermined point in the stripping cycle.

4. A hide puller as claimed in claim 1 wherein each of said hide gripper mechanisms comprises a pair of gripping jaw assemblies each consisting of a lower movable jaw member and an upper fixed jaw member and a linkage system including an actuating lever for moving the gripping jaw assemblies between an open and closed position.

5. A hide puller as claimed in claim 4 including a discharge bumper mounted on said frame disposed in the path of movement of said gripper mechanisms and adapted to engage the actuating levers thereby to open the gripping jaw assemblies to permit release of the hide gripped therein.

6. In combination with a hide puller as claimed in claim 1, a main conveyor assembly for continuously moving the slaughtered livestock along a predetermined path, the main conveyor including a moving chain and a fixed rail below the chain, the chain mounting a plurality of pushers adapted to engage trolley hangers supporting the carcasses of the livestock along the fixed rail, said hide puller for stripping hides from the carcasses positioned along said path at a hide pulling station, means defining a pocket in the fixed rail adjacent said hide puller whereby engagement of a trolley hanger in said pocket disengages its pusher to permit the hide to be stripped from the carcass at the hide pulling station, and an ejector mechanism for discharging the stripped carcass from the hide pulling station to a position on the rail where it may be engaged by a pusher.

7. The combination as claimed in claim 6 including stabilizer means mounted on the main frame comprising a pair of pivotally mounted spaced apart stabilizing elements having bifurcated terminal end portions adapted to straddle the lanyard carried by a hanger supporting a carcass thereby to support the weight of the carcass during a hide pulling cycle.

8. The combination as claimed in claim 6 including a discharge bumper mounted on said frame disposed in the path of movement of said gripper mechanisms and adapted to engage the actuating levers thereby to open the gripping jaw assemblies to permit release of the hide gripped therein and a snubber assembly cooperatively associated with said discharge bumper to snub the hide and insure release thereof from the gripper mechanism.

9. The combination as claimed in claim 6 including circuit control means for effecting operation of the various elements of the hide puller in a predetermined sequence of operation.

References Cited

UNITED STATES PATENTS

| | | | |
|---|---|---|---|
| 3,129,454 | 4/1964 | Johnson | 17—21 |
| 3,229,328 | 1/1966 | Schmidt | 17—21 |
| 3,317,949 | 5/1967 | Garcia et al. | 17—1 X |
| 3,324,505 | 6/1967 | Crawford et al. | 17—45 |
| 3,346,911 | 10/1967 | Bergman | 17—21 |

LUCIE H. LAUDENSLAGER, Primary Examiner

U.S. Cl. X.R.

17—50

UNITED STATES PATENT OFFICE
CERTIFICATE OF CORRECTION

Patent No. 3,478,386  Dated November 18, 1969

Inventor(s) FRED E. ROBISON and KENNETH C. COCHRAN

It is certified that error appears in the above-identified patent and that said Letters Patent are hereby corrected as shown below:

Column 12, line 28; "of operation the selected mechanism" should read --of operation the selected gripper mechanism--

SIGNED AND SEALED

AUG 25 1970

(SEAL)
Attest:

Edward M. Fletcher, Jr.
Attesting Officer

WILLIAM E. SCHUYLER, JR.
Commissioner of Patents